United States Patent [19]

Larsen

[11] Patent Number: 5,058,155
[45] Date of Patent: Oct. 15, 1991

[54] MULTIPURPOSE HEADSET AMPLIFIER

[75] Inventor: Leo Larsen, Kokkedal, Denmark

[73] Assignee: GN Netcom A/S, Copenhagen, Denmark

[21] Appl. No.: 444,752

[22] Filed: Dec. 1, 1989

[51] Int. Cl.⁵ ............................................. H04M 1/00
[52] U.S. Cl. .................................... 379/442; 379/430; 379/395
[58] Field of Search ............... 379/442, 443, 395, 441, 379/387, 430; 381/112, 113, 114

[56] References Cited

U.S. PATENT DOCUMENTS

| | | | |
|---|---|---|---|
| 3,742,153 | 6/1973 | Matsuda et al. | 379/395 |
| 4,162,374 | 7/1979 | Girard et al. | 379/395 |
| 4,696,032 | 9/1987 | Levy | 381/113 |
| 4,754,484 | 6/1988 | Larkin et al. | 379/430 |
| 4,782,524 | 11/1988 | McQuinn et al. | 379/387 |
| 4,918,726 | 4/1990 | Snyder | 379/395 |
| 4,930,148 | 5/1990 | Lee | 379/430 |
| 4,930,156 | 5/1990 | Norris | 379/430 |
| 4,951,002 | 8/1990 | Hanan | 379/387 |

FOREIGN PATENT DOCUMENTS

| | | | |
|---|---|---|---|
| 3207412 | 9/1983 | Fed. Rep. of Germany | 381/68 |
| 000825 | 1/1989 | Japan | 379/387 |

Primary Examiner—Jin F. Ng
Assistant Examiner—Jason Chan
Attorney, Agent, or Firm—Merchant & Gould, Smith, Edell, Welter & Schmidt

[57] ABSTRACT

A multipurpose headset amplifier for the connection of a headset (11) to a telephone instrument comprises a housing (5) having an ascending, thready holder (10) for a headset (11) and connection jacks (21, 22, 23) for the headset (11), the telephone instrument (22) and for the telephone instrument's handset, the housing having at the upper side comprises manuel operating members (6, 7, 8) for the adjustment of the device, and manual controls (15) at the underside for the adaptation of a headset to the impedance and signal level of any telephone instrument. The amplifier comprises an internal power supply (12) and a jack (13) for external power supply. The amplifier is furthermore provided with a microphone switch having a light-emitting diode (9), a volume control (7) and a switch (6).

1 Claim, 2 Drawing Sheets

MULTIPURPOSE HEADSET AMPLIFIER

BACKGROUND OF THE INVENTION

1. Field of the Invention

The invention relates to a device for a headset to be connected to any telephone instrument in order for the user to choose whether to apply the handset or the headset merely by operating a switch on the amplifier. The amplifier must be designed so that the handset works in the usual manner when the switch is in its first position and it must be able to be adjusted so that the headset works exactly like the handset when the switch is in its second position, thus usually rendering further switch operating unnecessary.

2. Disclosure of the prior art

There are headset amplifiers on the marked designed so as to connect a certain type of headset to a certain type of telephone instrument and having controls which render the adaptation and adjustment of signal levels possible.

It is a well-known fact that various telephone systems apply a number of various telephone instruments where the impedance and the signal levels of both the microphone and the sound reproducer can vary from one type of instrument to another.

Two of the most commonly used systems are system Merlin (AT&T), which is extensively used on the American continent, and system DYAD (Siemens), which is used in Europe. There is a substantial difference between systems applying carbon microphones and systems applying electronic microphones, like for instance electret microphones or dynamic microphones. Even if the same type of microphone, for instance a carbon microphone, is applied by two systems, there are systems with different transmission levels. Furthermore, the wiring differs in the various telephone instruments and accordingly, even if the telephone instruments are provided with standard modular jacks for the connection of the handset to the telephone instrument, the polarity must be considered at the coupling. Consequently, previously only headset amplifiers designed for certain types of telephone instruments were produced.

SUMMARY OF THE INVENTION

A multipurpose headset amplifier to be applied for connecting a headset to a telephone instrument comprises a housing with an ascending, thready holder for a headset and a connection jack for the headset, the telephone instrument and the telephone instrument's handset, which housing at the upper side comprises manual operating members for the adjustment of the device, and which housing at the underside comprises manual controls for the adaptation of a headset to the impedance and signal level of any telephone instrument, besides which the amplifier comprises amplifier and adaptation circuits for the headset as well as an internal power supply source, for instance a battery, and a jack for an external power supply source.

Hereby it becomes possible to couple a desired headset to any type of telephone instrument in that the multipurpose headset amplifier is provided with a sufficient number of switch members and controls, thus always rendering adaptation possible. Adaptation is possible even if the telephone instrument is of the type which cannot supply sufficient power to the amplifier circuits, in that the multipurpose headset amplifier is provided with an internal power supply for such applications.

Consequently, it is always possible to obtain the physical independence when communicating by telephone which is so important at numerous places of work, since it is not necessary to use the handset if you need both hands for something else. Furthermore, the possibility is obtained of highly increased listening quality and accordingly of safer comunication.

In order to increase the quality of communication the multipurpose headset amplifier according to the invention can be provided with a microphone switch with a signal member. The switch is preferably manually operated, but works electronically so that any trying noise in the sound reproducer is avoided when the switch is being used.

In order to increase the applicability of the amplifier and to avoid interruption of operations the amplifier is designed with a signal circuit which checks on both the battery's state and the overall setting of the device so that the batteries are not placed in the device and nor is the external power supply coupled, unless it is necessary. The signal circuits provide the sound reproducer in the headset with acoustic signals on this.

To increase the user comfort and to avoid operating errors there are at the upper side of the device only the operating members etc. to be used during the daily use of the device, whereas all the controls which adapt the amplifier to the telephone instrument are at the underside of the device and preferably under a cover in order to prevent the user from erroneously using these controls during the daily use.

The further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENT

Figure 1:
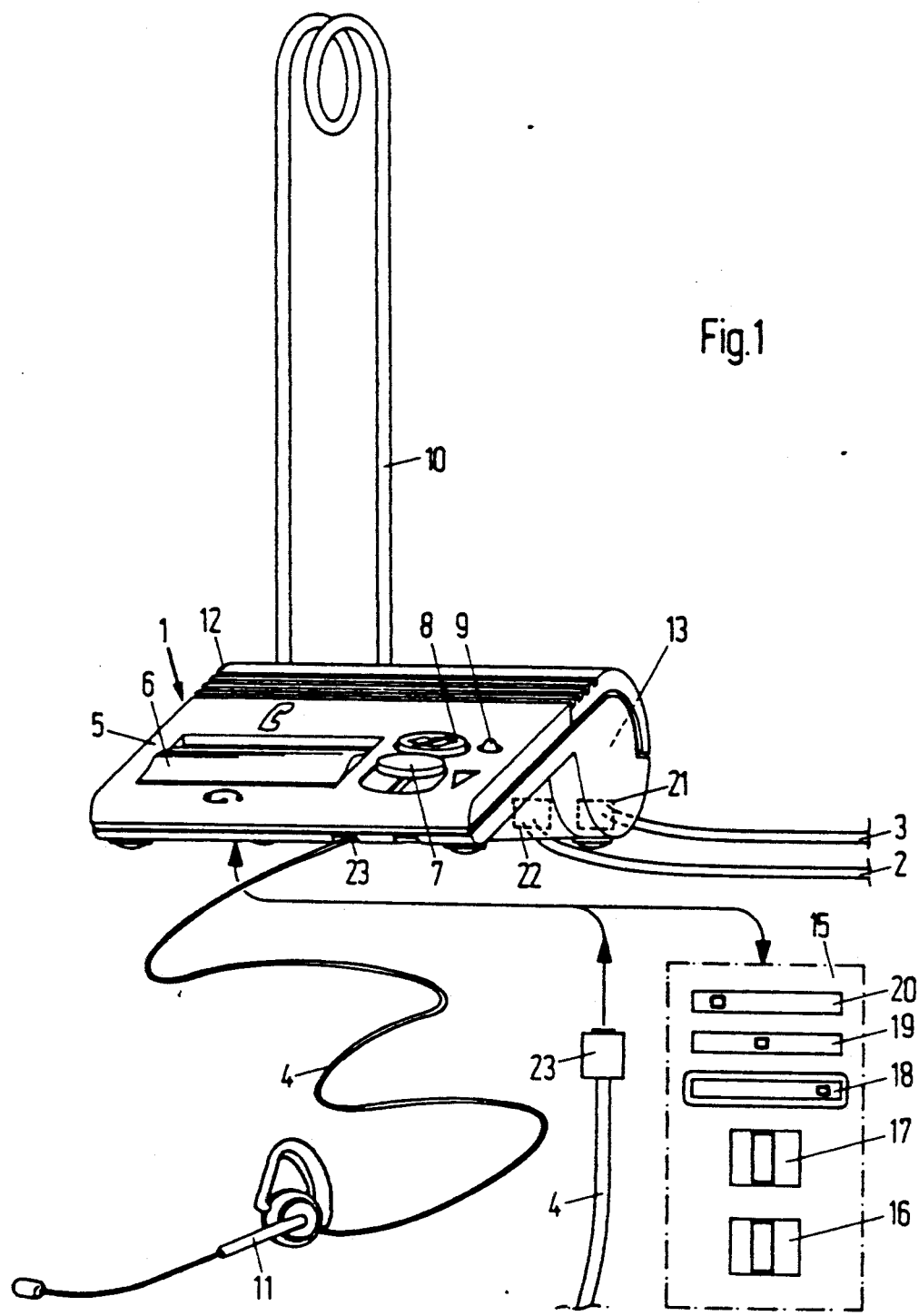
FIG. 1 is a full view of the device, its upper side with operating members and a section of the underside with controls.

FIG. 1 shows a multipurpose headset amplifier 1 according to the invention and comprising a plastic housing 5 with modular jacks 21 and 22 for the coupling of a telephone instrument by means of the wire 2, and the coupling of a handset by means of the wire 3. The amplifier 1 is simply coupled by dismounting the handset from the telephone instrument and by coupling the wire.2 instead. The wire 3 of the handset is inserted in the amplifier in the jack 21. The jacks 21 and 22 are standard modular jacks of a known type and are not shown in further detail in the drawing.

On the housing 5 a suspension hoop 10 is mounted for the suspension of a headset when it is not in use. The headset may be of any known type, for instance of the type described in U.S. Pat. application Ser. No. 248,490 or U.S. Pat. application Ser. No. 176,386 (also GN Netcom A/S, et al). The headset 11 is coupled to the amplifier 1 by means of a wire 4 and a jack 23, particularly the section of FIG. 1 showing a section of the underside of the housing 5.

On the upper side of the housing is placed a waving change-over switch 6 for the switching between the headset and the handset, the shown symbols. There are furthermore provided a volume control button 7 for the adjustment of the volume in the sound reproducer in the headset 11 and a microphone button 8 to control an electric microphone switch. A signal light 9 in the form of a light-emitting diode with low power consumption is coupled to the microphone button 8.

At the frontmost end of the housing 5 there is a battery chamber 12 for batteries or rechargeable Ni-Cad cells. The battery chamber could be replaced by a solar power unit, the below explanation. The solar power unit is mounted by removing the battery chamber cover and by inserting a solar power unit. At the frontmost end of the housing 5 there is furthermore a jack 13 which provides the possibility of connecting an external power supply, if the amplifier is applied in connection with a telephone instrument of the type which cannot supply the amplifier with power and a change of batteries is undesirable.

To the right of FIG. 1 is shown a section of the underside of the housing 5. Lowered under a detachable cover (not shown) there is a control unit 15 med a number of control members 16, 17, 18, 19, 20, which will all be explained later in connection with FIG. 2 of the drawing. Additionally is shown the coupling jack 23 for the wire 4 from the headset 11.

Figure 2:
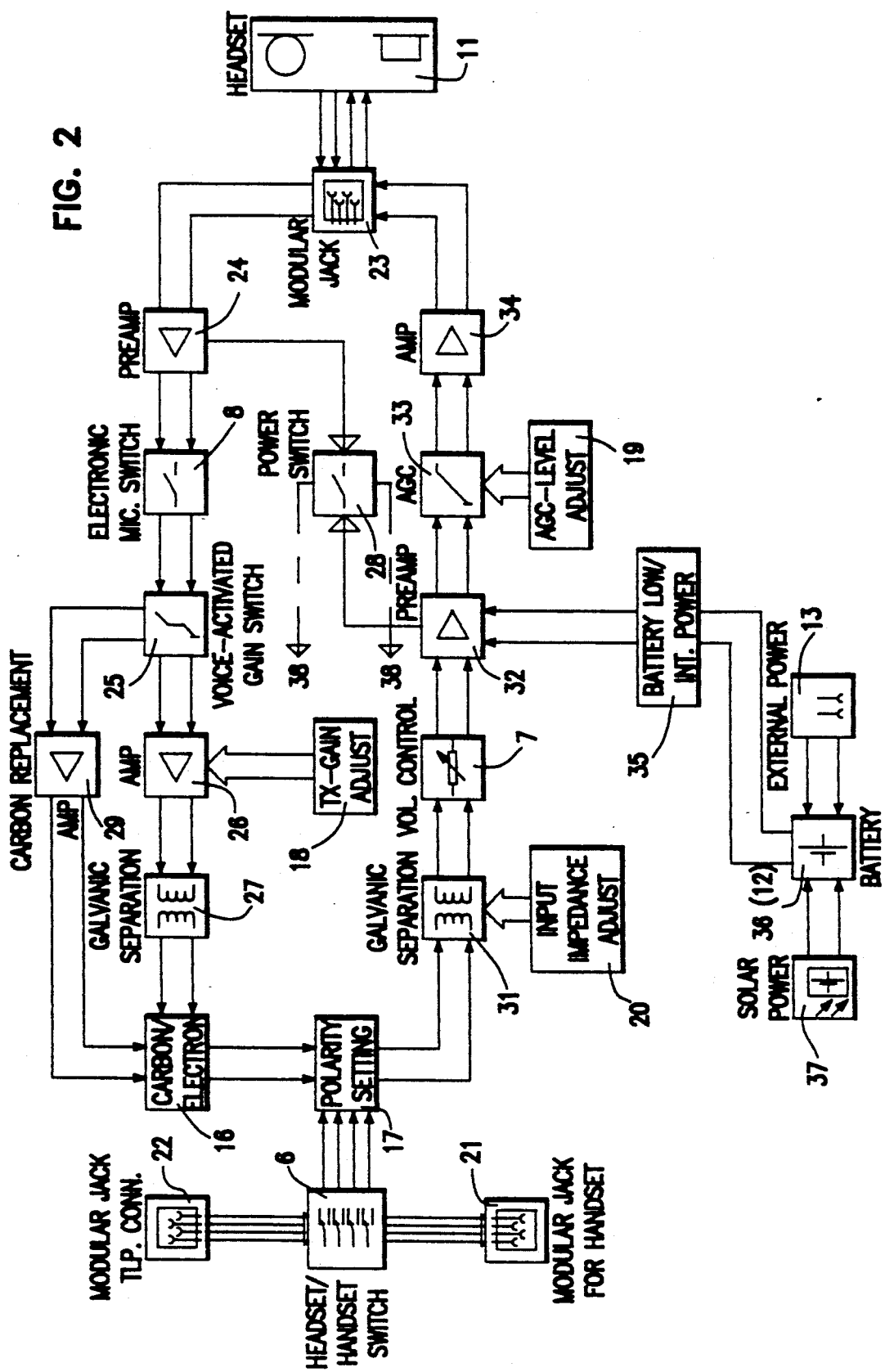
FIG. 2 is a block diagram showing the device's electronic circuit in full, the connection to a telephone instrument, a handset and a head-set.

In connection with FIG. 2 of the drawing it is hereafter explained how the multipurpose headset amplifier functions and how it is designed, in that FIG. 2 is a full block diagram showing the amplifier with control members and coupling jacks. The parts in FIG. 1 which reappear in FIG. 2 have the same reference numbers.

To the left of FIG. 2 is shown the modular jack 21 for the coupling of the handset and the modular jack 22 for the coupling of the telephone instrument, and to the right of FIG. 2 is shown a rough draft of the headset 11 which is coupled to the circuit by means of the jack 23.

The adaptation of the multipurpose headset amplifier begins with the two switches 16 and 17 which are also shown in FIG. 1. Each of these switches have three positions. The switch 16 determines whether the applied handset is a carbon type handset or an electronic type, usually either an electret microphone or a dynamic microphone. The switch 16 has two positions for carbon microphone types with different transmission levels and one position for electronic microphones. In case of the headset being electronic the adjustment must be continued with switch 17. This switch determines the polarity of the wires entering the amplifier. This switch has also three positions, namely a position for standard polarity, a position for Merlin (AT&T) telephone instruments, and a position for DYAD (Siemens) telephone instruments. When the switches 16 and 17 have been adjusted the potentiometer 18 is adjusted in order for the transmission level from the microphone in the headset 11 to correspond to the transmission level of the microphone in the handset. The potentiometer 18 is also shown in the section in FIG. 1. The remaining two potentiometers 19 and 20 adjust the level of automatic gain control and the input impedance in the receive amplifier to the sound reproducer of the headset.

In general FIG. 2 moreover shows two transmission paths; one from the microphone in the headset 11 to the telephone instrument as shown at the top of Fig. 1 through the blocks 24, 8, 25, 26, 27 or 29, and the other from the telephone instrument to the sound reproducer in the headset 11, and shown at the bottom of FIG. 2 through the blocks 31, 20, 7, 32, 33, 19 and 34.

At the very bottom of FIG. 2 are shown the power supply circuits.

In the following the function of the amplifier is explained. The signal from the electret microphone of the headset 11 is carried through the modular jack 23 to a preamplifier 24. The signal from this amplifier can be switched off by the built-in mute switch 8 which is maneuvered from the upper side of the housing 5. The mute switch 8 is electronic so that the user's ear is not bothered with any noise when the switch is activated. The signal hereafter passes a voice-activated gain switch 25 which will lower the transmission level by approximately 12 dB by microphone signals lower than normal speech level. Then the signal is carried either to the output amplifier 29, if the telephone instrument is provided with a carbon microphone, or to the output amplifier 26, the output of which can be varied by means of the potentiometer 18. The output of the electronic amplifier 26 is galvanically separated from the telephone wires by means of a transformer 27.

The signal received from the telephone instrument is carried to a transformer 31 so as to ensure galvanic separation from the amplifier. The slide resistor 20 with which the input impedance can be varied is coupled to the transformer. The signal is then carried to the volume control 7 (placed at the upper side of the device) from which the signal is carried on to a preamplifier 32. Hereafter the signal is carried to an automatic gain control circuit 33 which, by means of the regulator 19, a potentiometer, ensures that the signal for the output amplifier does not exceed a predetermined level. Finally the signal is carried to the output amplifier 34 and on to the sound reproducer of the headset 11.

Several different sources can supply the power needed. If the amplifier is applied to a telephone instrument with a carbon microphone, the electric power needed can be supplied by the telephone line. If case of an electronic microphone, however, a power supply must be applied. The power supply can be ordinary batteries or rechargeable batteries of the Ni-Cad type. The batteries 36, at the bottom of FIG. 2, are placed in the battery chamber 12. If batteries are undesirable, a DC power supply of the known type can be coupled via the external power jack 13. The batteries can be replaced by a solar power unit 37 in order to obtain a totally wireless power supply under all circumstances, if so desired.

If the amplifier is connected to a telephone instrument with a carbon microphone where there is no need for batteries and in order to reduce the batteries' power consumption in general, the power supply is provided with a circuit 35 which will produce a pulsatory tone in the telephone and thus indicate to the user that the batteries are switched on. A similar tone will indicate that the batteries are to be replaced.

In order to obtain the longest duration possible of the batteries, the amplifier is provided with an automatic power switch 28 which, after a predetermined period of time during which the amplifier has been out of use, will reduce the power consumption to approximately 25% of the consumption by normal working conditions. The power switch supplies power to the amplifier circuits through the wires 38. As soon as the amplifier is about to be used again, i.e. when the microphone signal in one of the preamplifiers 24 or 32 exceeds a certain level, the power switch will bring the circuits back to normal working conditions. The electric components listed below could for instance be applied for the formation of the circuit shown in FIG. 2 of the drawing.

7: SLIDE POTENTIOMETER 22K LIN CTS U 448-20M-223 DAN

8: UNIMEC MODULAR SWITCH TYPE 15550

18: CTS 22K OHM LOG XL 448-20M-223 BBN—SLIDE POTENTIOMETER

19: CTS 22K OHM LOG XL 448-20M-223 BBN—SLIDE POTENTIOMETER

20: CTS 22K OHM LOG XL 448-20M-223 BBN—SLIDE POTENTIOMETER

24: ICL 7621

25: DISCRETE CIRCUITRY WITH ICL 7611

26: ICL 7611

27: TRANSFORMER 1:1 RIKEI CORP. S10-7884C

28: 2 PCS. ICL 7611

29: DISCRETE COMPONENTS WITH BCW 30, BCW 60 AND BCW 33

31: TRANSFORMER 1:1 RIKEI CORP. S10-7884C

32: ICL 7621

33: ICL 7611

34: ICL 7611

35: 2 PCS. ICL 7611

36: 2 PCS. ALKALINE BATTERIES SIZE AA

37: SUNCERAM II, TYPE BP-4211C4 OR EQUIVALENT

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A multipurpose headset amplifier device for the connection of a headset to be attached to a telephone instrument and comprising a housing with an ascending, thready holder for a headset and connection jacks for the headset, said housing having at the upper side comprises manual operating members for the adjustment of the device, and which housing at the underside comprises manual controls for the adaption of a headset to the impedance and signal level of any telephone instrument, and wherein the amplifier device comprises amplifier and adjustment circuits for the headset and an internal power supply source and a jack for an external power supply source, in that the amplifier circuit from the headset microphone to the telephone instrument comprises a preamplifier, an electronic microphone switch circuit, a voice-activated gain switch, a manually adjustable amplifier and a galvanic separation circuit comprising a transformer, and a carbon microphone amplifier circuit for the shunt coupling of the adjustable amplifier and the galvanic separation circuit, and in that the amplifier circuit from the telephone instrument to the headset sound reproducer comprises a galvanic separation circuit having impedance control members, a volume control circuit, a preamplifier circuit, a threshold value-adjustable adjustment circuit and an output amplifier.

* * * * *